US007340455B2

(12) United States Patent
Platt et al.

(10) Patent No.: US 7,340,455 B2
(45) Date of Patent: Mar. 4, 2008

(54) CLIENT-BASED GENERATION OF MUSIC PLAYLISTS FROM A SERVER-PROVIDED SUBSET OF MUSIC SIMILARITY VECTORS

(75) Inventors: John Platt, Redmond, WA (US); Erin Renshaw, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 457 days.

(21) Appl. No.: 11/045,930

(22) Filed: Jan. 27, 2005

(65) Prior Publication Data
US 2006/0112082 A1 May 25, 2006

Related U.S. Application Data

(62) Division of application No. 10/993,109, filed on Nov. 19, 2004.

(51) Int. Cl.
G06F 17/30 (2006.01)
(52) U.S. Cl. .................... 707/3; 707/100; 707/102; 348/207.99
(58) Field of Classification Search .............. 707/102, 707/3, 5
See application file for complete search history.

(56) References Cited

U.S. PATENT DOCUMENTS

| 5,787,422 | A * | 7/1998 | Tukey et al. ................ 707/5 |
| 6,539,395 | B1 * | 3/2003 | Gjerdingen et al. ........ 707/102 |
| 2002/0107852 | A1 * | 8/2002 | Oblinger ..................... 707/5 |

OTHER PUBLICATIONS

Beth Logan & Ariel Salomon, A Content-Based Music Similarity Function, Jun. 2001, Cambridge MA 02139, 12 pages.*
Tao Li et al., Content based music similarity search and emotion detection, 2004, University of Rochester, 4 pages.*
Micheal I. Mandel et al., Support vector machine active learning for music retrieval, Department of Electrical Engineering, 10 pages.*
Jonathan Foote, Visualizing music and audio using self-similarity, FX Palo Alto Laboratory, Inc. 7 pages.*
Arpi Mardirossian et al., Music summarization via key distributions: analyses of similarity assessment across variations, University of southern California Viterbi school of engineering, 6 pages.*
Namunu C. Maddage et al., Music structure based vector space retrieval, Institute for Infocomm Research, Aug. 6-11, 2006, 8 pages.*
Bengio, Y., J.-F. Paiement, and P. Vincent, Out-of-sample extensions for LLE, ISOmap, MDS, Eigenmaps and spectral clustering, In S. Thrun, L. Saul, and B Schølkopf, editors, *Proc. NIPS*, vol. 16, 2004.
Bradley, A. P., The user of area under the ROC curve in the evaluation of machine learning algorithms. *Pattern Recognition*, 1997, vol. 30, No. 7, pp. 1145-1159.

(Continued)

*Primary Examiner*—John Cottingham
*Assistant Examiner*—Noosha Arjomandi
(74) *Attorney, Agent, or Firm*—Lyon & Harr, LLP; Mark A. Watson

(57) ABSTRACT

A "Music Mapper" automatically constructs a set coordinate vectors for use in inferring similarity between various pieces of music. In particular, given a music similarity graph expressed as links between various artists, albums, songs, etc., the Music Mapper applies a recursive embedding process to embed each of the graphs music entries into a multi-dimensional space. This recursive embedding process also embeds new music items added to the music similarity graph without reembedding existing entries so long a convergent embedding solution is achieved. Given this embedding, coordinate vectors are then computed for each of the embedded musical items. The similarity between any two musical items is then determined as either a function of the distance between the two corresponding vectors. In various embodiments, this similarity is then used in constructing music playlists given one or more random or user selected seed songs or in a statistical music clustering process.

19 Claims, 7 Drawing Sheets

OTHER PUBLICATIONS

Cox, T. F., and M. A. A. Cox, *Multidimensional Scaling*, No. 88 in Monographs on Statistics and Applied Probability, Chapman & Hall/CRC, 2nd edition, 2001.

de Silva, V., and J. B. Tenenbaum, Global versus local methods in nonlinear dimensionality reduction, *Proc. NIPS*, 2003, vol. 15, pp. 721-728.

Ellis, D. P. W., B. Whitman, A. Berenzweig, and S. Lawrence, The quest for ground truth in musical artist similarity, *Proc. Int'l Conf. on Music Information Retrieval (ISMIR)*, 2002.

Faloutsos, C., and K.-I. Lin, Fastmap: A fast algorithm for indexing, data-mining and visualization of traditional and multimedia databases, *Proc. ACM SIGMOD*, 1995, pp. 163-174.

Floyd, R., Algorithm 97 (shortest path), *Communications of the ACM*, 1962, vol. 7, p. 345.

Johnson, D. B., Efficient algorithms for shortest paths in sparse networks, *JACM*, vol. 24, pp. 1-13, 1977.

Platt, J. C., C. J. C. Burges, S. Swenson, C. Weare, and A. Zheng, Learning a Gaussian process prior for automatically generating music playlists, *Proc. NIPS*, 2002, vol. 14, pp. 1425-1432.

Takane, Y., F. W. Young, and J. de Leeuw, Nonmetric individual differences multidimensional scaling: an alternating least squares method with optimal scaling features, *Psychometrika*, 1977, vol. 42, pp. 7-67.

Tenenbaum, J. B., Mapping a manifold of perceptual observations, *Proc. NIPS*, 1998, vol. 10, pp. 682-688.

\* cited by examiner

CLIENT-BASED GENERATION OF MUSIC PLAYLISTS FROM A SERVER-PROVIDED SUBSET OF MUSIC SIMILARITY VECTORS

CROSS REFERENCE TO RELATED APPLICATIONS

This application is a Divisional Application of U.S. patent application Ser. No. 10/993,109, filed on Nov. 19, 2004, by Platt, et al., and entitled "CONSTRUCTING A TABLE OF MUSIC SIMILARITY VECTORS FROM A MUSIC SIMILARITY GRAPH," and claims the benefit of that prior application under Title 35, U.S. Code, Section 120.

BACKGROUND

1. Technical Field

The invention is related to identifying similarity between music objects, and in particular, to a system and method for using a set of music similarities, expressed as a graph with weighted links, for constructing a set of coordinate vectors, with the coordinate vectors then being used for approximating a similarity distance between any two or more music objects.

2. Related Art

One of the most reliable methods for determining similarity between two or more pieces of music is for a human listener to listen to each piece of music and then to manually rate or classify the similarity of that particular piece of music to other pieces of music. Unfortunately, such methods are very time consuming and are limited by the library of music available to the person that is listening to the music.

This problem has been at least partially addressed by a number of conventional schemes by using collaborative filtering techniques to combine the preferences of many users or listeners to generate composite similarity lists. In general, such techniques typically rely on individual users to provide one or more lists of music or songs that they like. The lists of many individual users are then combined using statistical techniques to generate lists of statistically similar music or songs. Unfortunately, one drawback of such schemes is that less well known music or songs rarely make it to the user lists. Consequently, even where such songs are very similar to other well known songs, the less well known songs are not likely to be identified as being similar to anything. As a result, such lists tend to be more heavily weighted towards popular songs, thereby presenting a skewed similarity profile.

Other conventional schemes for determining similarity between two or more pieces of music rely on a comparison of metadata associated with each individual song. For example, many music type media files or media streams provide embedded metadata which indicates artist, title, genre, etc. of the music being streamed. Consequently, in the simplest case, this metadata is used to select one or more matching songs, based on artist, genre, style, etc. Unfortunately, not all media streams include metadata. Further, even songs or other media objects within the same genre, or by the same artist, may be sufficiently different that simply using metadata alone to measure similarity sometimes erroneously results in identifying media objects as being similar that a human listener would consider to be substantially dissimilar. Another problem with the use of metadata is the reliability of that data. For example, when relying on the metadata alone, if that data is either entered incorrectly, or is otherwise inaccurate, then any similarity analysis based on that metadata will also be inaccurate.

Still other conventional schemes for determining similarity between two or more pieces of music rely on an analysis of the beat structure of particular pieces of music. For example, in the case of heavily beat oriented music, such as, for example, dance or techno type music, one commonly used technique for providing similar music is to compute a beats-per-minute (BPM) count of media objects and then find other media objects that have a similar BPM count. Such techniques have been successfully used to identify similar songs. However, conventional schemes based on such techniques tend to perform poorly where the music being compared is not heavily beat oriented. Further, such schemes also sometimes identify songs as being similar that a human listener would consider as being substantially dissimilar.

Another conventional technique for inferring or computing audio similarity includes computing similarity measures based on statistical characteristics of temporal or spectral features of one or more frames of an audio signal. The computed statistics are then used to describe the properties of a particular audio clip or media object. Similar objects are then identified by comparing the statistical properties of two or more media objects to find media objects having matching or similar statistical properties. Similar techniques for inferring or computing audio similarity include the use of Mel Frequency Cepstral Coefficients (MFCCs) for modeling music spectra. Some of these methods then correlate Mel-spectral vectors to identify similar media objects having similar audio characteristics.

Still other conventional methods for inferring or computing audio similarity involve having human editors produce graphs of similarity, and then using conventional clustering or multidimensional scaling (MDS) techniques to identify similar media objects. Unfortunately, such schemes tend to be expensive to implement, by requiring a large amount of editorial time. Further, these conventional MDS-based techniques also typically require large amounts of computational overhead.

For example, well known conventional MDS algorithms, such as "ALSCAL," or "Isomap," to name only two of many, typically apply an MDS algorithm to a sparse matrix of dissimilarities and then use the results to find vectors whose inter-vector distances are well matched to the dissimilarities. In other words, identifying a matrix of artists and/or music as the sparse matrix, and then using conventional MDS techniques for embedding the artists/music into a low-dimensional space allows similarities between any two or more artists/music to be determined. Unfortunately, the computational complexity of the embedding techniques employed by these methods typically inhibits their use on large data sets which can potentially include many thousands of music artists and potentially millions of songs.

Therefore, what is needed is a system and method for efficiently identifying similar media objects such as songs or music. Further, such a system and method should be capable of operation without the need to perform computationally expensive audio matching analyses. Finally, this system and method should be capable of quickly embedding potentially very large sparse graphs of music similarity (i.e., large data sets of artists and songs) into a multi-dimensional space while reducing computational overhead.

SUMMARY

A "Music Mapper," as described herein, operates to solve the problems identified above by automatically constructing a set coordinate vectors for use in inferring similarity between various pieces of music. In general, given a music similarity graph expressed as links between various artists, albums, songs, etc., the Music Mapper applies a recursive embedding process to embed each of the graphs music entries into a multi-dimensional space. In addition, this recursive embedding process also accounts for the addition of new music items to the music similarity graph.

In general, the Music Mapper first embeds each of the graphs' music entries (i.e., the graphs' "nodes") into a multi-dimensional space using either multi-dimensional scaling (MDS) techniques, such as, for example, Landmark MDS, or an embedding technique introduced herein that is referred to as "fast sparse embedding" or simply "FSE." Note that for purposes of explanation, the multi-dimensional space containing embedded music items will be generally referred to throughout this description as either "multi-dimensional space" or simply as "music space."

Further, a recursive embedding update process is used to embed new music items into music space once they have been added to the music similarity graph. This recursive embedding update process generally operates by first attempting to identify a convergent solution for embedding newly graphed music items into music space without repositioning existing embedded entries. If a convergent solution cannot be reached after a fixed number of iterations, a non-convergent solution is used.

Given this recursive embedding of music items into music space, coordinate vectors are then computed for each of the embedded musical items and stored to a set or table of coordinate vectors. This set of coordinate vectors is then used for a number of purposes, such as, for example, constructing music playlists from one or more random or user selected seed songs, or for clustering similar songs, albums, or artists. In various embodiments, the similarity between any two musical items is then determined as either a function of the distance between the two corresponding coordinate vectors, or as a function of a statistical clustering process.

In one embodiment, the Music Mapper operates in a server-client configuration in order to limit the amount of information that needs to be distributed to the clients. Specifically, the music similarity coordinate vectors are computed on the server, then provided to one or more clients, as needed. While the coordinate vectors can be computed directly by each client, this embodiment is less advantageous in that it requires that each client has a local copy of the music similarity graph, which can be very large. Further, as new music becomes available, it is easier to update a single global copy of the graph held by the server rather than updating graphs held by each of a plurality of clients.

Therefore, rather than requiring each client computer to generate the music similarity table, this process is instead performed by one or more master or global servers. In general, the global server (or servers) is first used to generate the similarity graph from all available music. Note that since this process is performed offline, the music similarity graph can potentially include millions of music entries. Further, as new music becomes available, the global server simply updates the music similarity graph to include the new entries.

The global server then uses the aforementioned recursive embedding algorithm to embed each of the individual music entries represented in the similarity graph into a multidimensional space. Given this embedding, coordinate vectors are then computed for each of the embedded musical items.

The coordinate vectors are then stored in a global similarity table. As noted above, the similarity between any two musical items is then simply determined as either a function of the distance between those two vectors. Consequently, each local client needs only have a subset of the entire table of coordinate vectors, corresponding to the music that the user currently has access to. This is much smaller than the original graph of musical similarity.

Therefore, in one embodiment, each client simply sends a list of the music available to the client to the global server, and receives a set of all of the coordinate vectors corresponding to that music in return. Consequently, whenever similarity data is needed, such as for constructing a music playlist, the client simply processes the downloaded coordinate vectors to generate one or more similarity-based playlists, as described herein.

In addition to the just described benefits, other advantages of the Music Mapper will become apparent from the detailed description which follows hereinafter when taken in conjunction with the accompanying drawing figures.

DESCRIPTION OF THE DRAWINGS

The specific features, aspects, and advantages of the Music Mapper will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
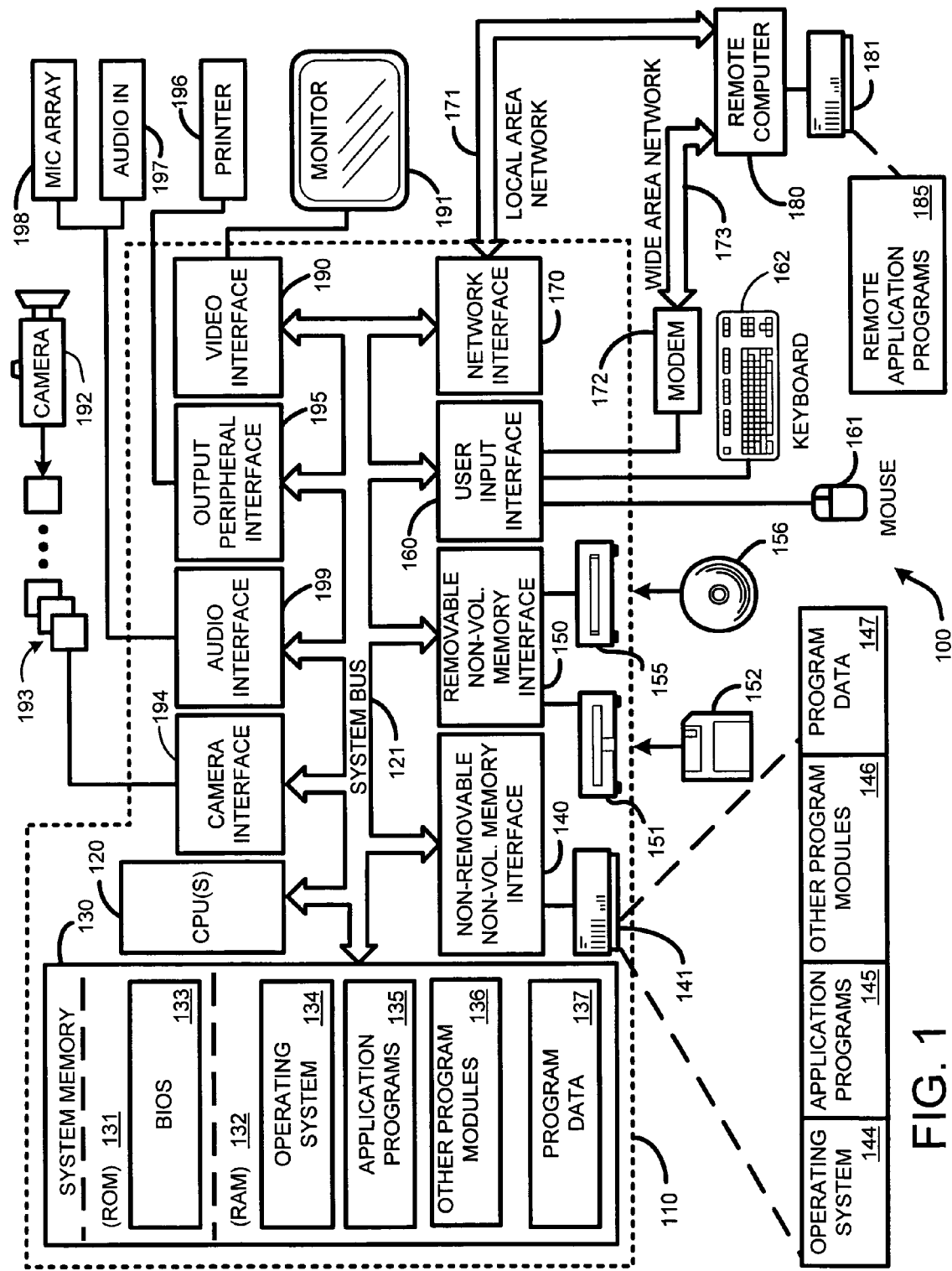
FIG. 1 is a general system diagram depicting a general-purpose computing device constituting an exemplary system for constructing a table of music similarity vectors from a music similarity graph for use in playlist generation, as described herein.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver/tuner, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, or other audio input device, such as, for example, a radio tuner or other audio input 197 connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor 191, computers may also include other peripheral output devices such as a printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras of various types may be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194 using conventional interfaces, including, for example, USB, IEEE 1394, Bluetooth™, etc. This interface is connected to the system bus 121, thereby allowing the images 193 to be routed to and stored in the RAM 132, or any of the other aforementioned data storage devices associated with the computer 110. However, it is noted that previously stored image data can be input into the computer 110 from any of the aforementioned computer-readable media as well, without directly requiring the use of a camera 192.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a system and method for automatically constructing tables or sets of music similarity vectors for use in playlist generation.

2.0 Introduction:

Graphs with relatively few edges, in comparison to the possible number of edges given some number of nodes, are conventionally referred to as being "sparse." Conversely, a graph with many edges is typically referred to as being "dense." Sparse graphs are frequently used to identify relationships or linkages between various nodes, where the relationships between every node, relative to the others is not directly known.

In the case of music similarity, the relationships between a set of musical entities, such as, for example, particular artists, albums, tracks, etc., are represented by a sparse graph. Such sparse graphs are referred to herein as "music similarity graphs." Such music similarity graphs identify similarities or linkages such as, for example, whether artist A is similar to artist B, whether song C is close to song D, whether the genre of album E is related to that of artist F, etc. Such similarity graphs are useful for a number of purposes, including, for example, providing a visual representation of artist, album, or song similarity; and identifying music that "sounds like" other music.

A "Music Mapper," as described herein, operates to automatically construct a set or table of coordinate vectors (i.e., a "music similarity table") for use in inferring similarity between any two pieces of music. These coordinate vectors are generated from a music similarity graph expressed as links between various nodes (artists, albums, songs, etc.) in the graph. Such graphs may be derived from a number of sources, including, for example, human edited music similarity graphs, similarity graphs generated using collaborative filtering techniques, similarity graphs generated as a function of monitored radio or network broadcast playlists, and tables constructed from music metadata. Further, in one embodiment, one or more music similarity graphs from any or all of these sources are combined to create a "unified" music similarity graph. Note that Music Mapper is described with respect to constructing a music similarity table for use in inferring similarity between any two pieces of music. However, it should be understood that the techniques described herein are equally applicable to any media objects (including songs, videos, advertisements, etc.) whose relationship can be reduced to a sparse graph such as the music similarity graph.

In general, the Music Mapper first embeds a subset of the graphs' music entries (i.e., the graphs' "nodes") into a multi-dimensional space using either multi-dimensional scaling (MDS) techniques, such as, for example, Landmark MDS (LMDS), or an embedding technique introduced herein that is referred to as "fast sparse embedding" or simply "FSE." Note that for purposes of explanation, the multi-dimensional space containing embedded music items will be generally referred to throughout this description as either "multi-dimensional space" or simply as "music space."

Further, a recursive embedding update process is then used to embed new music items into music space once they have been added to the music similarity graph. This recursive embedding update process generally operates by first attempting to identify a convergent solution for embedding newly graphed music items into music space without repositioning existing embedded entries. If a convergent solution cannot be reached within a fixed number of iterations, a non-convergent solution is used.

Given this recursive embedding of music items into music space, coordinate vectors are then computed for each of the embedded musical items and stored to a set or table of coordinate vectors. This set of coordinate vectors is then used for a number of purposes, such as, for example, constructing music playlists from one or more random or user selected seed songs, or for clustering similar songs, albums, or artists. In various embodiments, the similarity between any two musical items is then determined as a function of the distance between the two corresponding coordinate vectors.

2.1 System Overview:

As noted above, the Music Mapper operates on a graph of music similarities by embedding data points of the graph into a multi-dimensional space, referred to herein as simply "music space." Given this embedding, coordinate vectors are computed for each entry. However, there are very large number of music artists, and potentially millions of individual songs by the various music artists. Consequently, music similarity graphs including all or part of this music/artist information can quickly become extremely large. Therefore, computational overhead with respect to the embedding process is a major concern, as conventional embedding methods tend to be computationally expensive, especially with respect to large data sets or large sparse graphs, such as the music similarity graphs described herein.

To partially address these computational overhead problems, an embedding process referred to herein as "fast sparse embedding" or simply as (FSE) is introduced. In general, this FSE process, as described in further detail in Section 3.2 operates to significantly reduce the computational overhead of embedding the data of large sparse similarity graphs into a multi-dimensional space. In other words, the FSE process described herein operates to quickly embed the entries in the music similarity graph into music space while minimizing the computational costs to accomplish this embedding. However, even with techniques such as FSE, it should be appreciated that one or more very large music similarity graphs can be constructed to identify some or even all available music. Therefore, given the potential size of the music similarity graphs, it is advantageous to limit the number of computers that perform the embedding.

Consequently, in one embodiment, the Music Mapper operates in a server-client configuration in order to limit computational overhead. Specifically, the music similarity coordinate vectors are computed from the embedded data on the server, then provided to one or more clients, as needed. While the coordinate vectors can be computed directly by each client, such an embodiment is less advantageous in that it requires that each client has a local copy of the music similarity graph, for performing both the embedding computations. Further, as new music becomes available, it is easier to update a global copy of the music similarity graph held by the server than to update the local copies of the graphs held by each of a plurality of clients.

Therefore, rather than requiring each client computer to generate the music similarity table of coordinate vectors, this process is instead performed by one or more global servers. In general, the global server (or servers) is first used to generate the similarity graph from all available music. Note that since this process is performed offline, the music similarity graph can potentially include millions of music entries. Further, as new music becomes available, the global server simply updates the music similarity graph to include the new entries. Note also that existing similarity graphs are also used by the Music Mapper in one embodiment, so as to avoid the necessity of constructing such graphs.

The global server then uses the aforementioned recursive embedding algorithm to embed each of the individual music entries represented in the similarity graph into a multi-dimensional space. Given this embedding, coordinate vectors are then computed for each of the embedded musical items. The coordinate vectors are then stored to a global similarity table. As noted above, the similarity between any two musical items is then simply determined as either a function of the distance between those two vectors, or as a function of a statistical clustering process. Consequently, each local client needs only have a subset of the entire table of coordinate vectors, corresponding to the music that the user currently has access to. This is much smaller than the original graph of musical similarity.

Therefore, in one embodiment, each client simply sends a list of the music available to the client to the global server, and receives a set of all of the coordinate vectors corresponding to that music in return. Consequently, whenever similarity data is needed, such as for constructing a music playlist, the client simply processes the downloaded coordinate vectors to generate one or more similarity-based playlists, as described herein.

Figure 2:
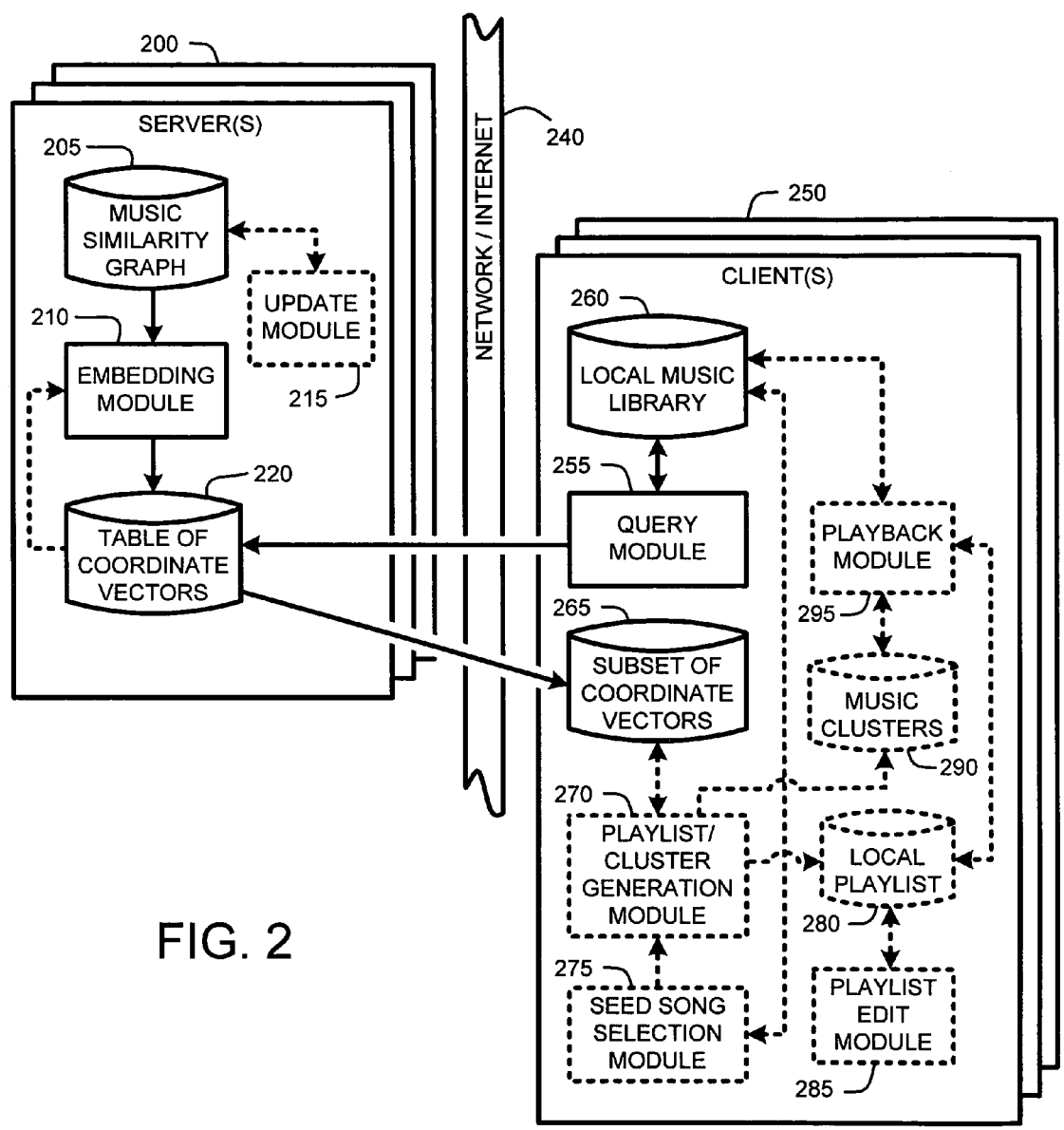
FIG. 2 illustrates an exemplary architectural diagram showing exemplary program modules in a server-client configuration for automatically embedding entries in a music similarity graph into a multi-dimensional space and generating coordinate vectors from the embedded data, as described herein.

2.2 System Architecture:

The following discussion illustrates the processes summarized above for automatically constructing a music similarity table from a music similarity graph with respect to the architectural flow diagram of FIG. 2. In particular, the architectural flow diagram of FIG. 2 illustrates the interrelationships between program modules for implementing the Music Mapper for automatically embedding entries in a music similarity graph into a multi-dimensional space and generating coordinate vectors from the embedded data.

It should be noted that the boxes and interconnections between boxes that are represented by broken or dashed lines in FIG. 2 represent alternate embodiments of the Music Mapper, and that any or all of these alternate embodiments, as described herein, may be used in combination with other alternate embodiments that are described throughout this document. It should also be noted that FIG. 2 illustrates operation of the Music Mapper in a server-client configuration. However, it should be understood that the function of the server computer illustrated in FIG. 2 can be completely performed by the client computer (conversely, the operations of the client may be performed by the server).

In general, as illustrated by FIG. 2, operation of the Music Mapper begins by using a server computer 200 to provide a music similarity graph 205 (i.e., a sparse graph of similarity relationships between various artists, albums, and tracks) to an embedding module 210.

As described in further detail in Section 3.1, the Music Mapper described herein is capable of using music similarity graphs 205 which are derived from a number of sources, including, for example, human edited music similarity graphs, similarity graphs generated using collaborative filtering techniques, similarity graphs generated as a function of monitored radio or network broadcast playlists, and similarity graphs constructed from music metadata. Further, also as described in greater detail in Section 3.1, in one embodiment, one or more music similarity graphs 205 from any or all of these sources are combined to create a "unified" music similarity graph. Note that the generation or modification of the music similarity graph 205 (as described in Section 3.1) is accomplished using an update module 215.

The embedding module 210 then processes the music similarity graph to embed the nodes of the graph (i.e., the artists, songs, tracks, etc,) into a multi-dimensional space as a function of the links (or edges) of the music similarity graph. In general, the embedding module performs an initial embedding using either MDS or other conventional embedding techniques, or the new FSE techniques described herein for embedding the music into music space. Once this initial embedding is complete, the embedding module 210 handles updates to the music similarity graph 205 using a recursive embedding process. As described in further detail in Section 3.2.3, this recursive embedding process generally operates by first attempting to identify a convergent solution for embedding newly graphed music items into music space without repositioning existing embedded entries. If a convergent solution cannot be reached within a fixed number of iterations, a non-convergent solution is used.

Given this recursive embedding of music items into music space by the embedding module 210, coordinate vectors representing each of the embedded items are then stored to a set or table 220 of coordinate vectors. This set of coordinate vectors 220 is then regularly updated by the embedding module 210, as more data becomes available (i.e., as the music similarity graph 205 is updated via the update module 215).

These steps, embedding and recursive generation of the table of coordinate vectors 220 from the music similarity graph 205, are completed on the server 205, which then stores the table of coordinate vectors to be served up to individual clients 250 via a network connection 240 such as, for example, the Internet, or other network.

The client 250 has a limited list of personal music, typically stored as a finite local music library 260. The client 250 uses a query module 255 to read that list of music in the local music library 260 and send a query to the server 200 requesting copies of the coordinate vectors corresponding to the entries in the list. The server 200 then responds to the query module 255 by sending the coordinate vectors corresponding to the entries in the local music library to a client maintained subset of coordinate vectors 265.

In one embodiment, a playlist/cluster generation module 270 then processes the subset of coordinate vectors 265 to generate a playlist 280 given one or more "seed songs" selected via a seed song selection module 275. In one embodiment, the playlist/cluster generation module 270 operates to generate a playlist 280 of songs that are sequentially complementary to one another in the sense that the transition from one song to the next avoids abrupt transitions in the theme or mood of the songs during playback. In one embodiment, a playlist edit module 285 is provided to allow user edits and browsing of the local playlist 280 generated by the playlist generation module.

The playlist generation module/cluster 270 operates in one of several ways. For example, in one embodiment, the playlist/cluster generation module 270 generates the playlist 280 by comparing to the coordinate vector of the seed song to the coordinate vectors in the subset of coordinate vectors 265. In general, given one or more seed songs, the coordinate vector having the closest distance, as described in Section 3.4, is chosen as the next song in the list, on an iterative basis.

In a related embodiment, rather than determine a distance between the vectors, the playlist/cluster generation module 270 uses a probabilistic clustering process to generate clusters 290 of similar artists, albums, and/or tracks. In this case, playlists are generated as a function of similar music clusters 290, as described in Section 3.5. For example, once the subset of coordinate vectors 265 are analyzed by the playlist/cluster generation module 270, the client 250 simply provides a cluster of similar music, either at random, or in response to a seed song selected via the seed song selection module.

In either case, whether identifying specific playlists 280 or music clusters 290, in one embodiment, a playback module 295 is provided for reading either the playlists 280 or clusters 290 and then providing the corresponding music to a conventional media playback device from the local music library 260. Alternatively, playback module 295 can be used to copy music in a playlist or cluster onto a portable music player or portable fixed medium (such as a CD-ROM).

3.0 Operation Overview:

The above-described program modules are employed by the Music Mapper for automatically constructing a music similarity table from a music similarity graph. The following sections provide a detailed operational discussion of exemplary methods for implementing the aforementioned program modules.

Figure 3:
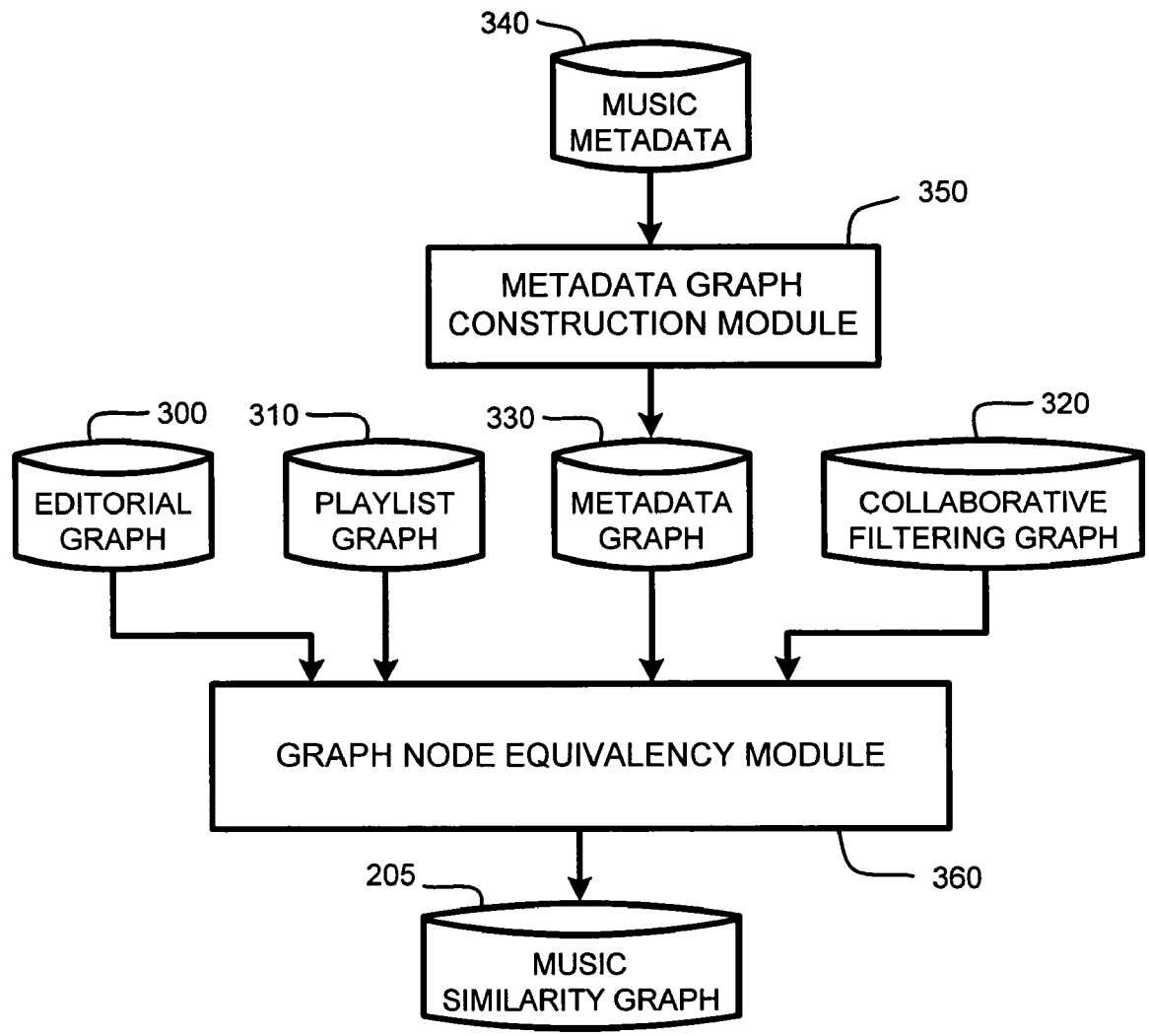
FIG. 3 illustrates an exemplary architectural diagram for constructing a music similarity graph from any of a plurality of types of sparse graphs, as described herein.

3.1 Music Similarity Graphs:

As noted above, the music similarity graphs used by the Music Mapper are basically conventional sparse graphs, where the nodes represent some or all of albums, tracks, and artists, and the edges represent the similarity or distance between various nodes in the graph. These music similarity graphs may be obtained from a number of sources, or in various embodiments, generated, refined, or updated prior to embedding the nodes of the graph into music space. For example, as illustrated in FIG. 3, there are a number of possible sources for sparse graphs that are to be used for the music similarity graph 205, including editorial similarity graphs 300, playlist-based similarity graphs 310, collaborative filtering-based similarity graphs 320, and metadata-based similarity graphs 330.

For example, editorial graphs 300 are simply hand designed sparse graphs of music item relationships. In particular, such graphs are typically manually constructed by human editors for describing which artists are similar to others, which albums are similar to others, and which tracks are similar to others. In addition, such editorial graphs 300 may contain "belongs to" type relationships, such as a track appeared on an album, and an album was created by an artist. Such sparse graphs are readily available, or may be custom designed for particular sets or collections of music. Such techniques are well known to those skilled in the art, and will not be described in detail herein.

Playlist-based similarity graphs are sparse graphs that are automatically generated as a function of music item appearance in an authored media stream, such as, for example, a radio broadcast. For example, as described in a copending U.S. patent application entitled "A SYSTEM AND METHOD FOR INFERRING SIMILARITIES BETWEEN MEDIA OBJECTS," having a filing date of Oct. 13, 2004, and assigned Ser. No. 10/965,604, the subject matter of which is incorporated herein by this reference, a "similarity quantifier," as operates to automatically infer similarities between media objects identified in one or more authored media streams through a statistical characterization of the position and order of music objects in one or more monitored media streams. In one embodiment, the similarity quantifier uses an ordered list of media objects to produce a graph data structure that reflects adjacency in the ordered list of media objects. Nodes in this graph represent particular media objects, while edges in the graph represent adjacency. Each edge has a corresponding similarity, which is a measure of how often the two objects are adjacent in the ordered list. This graph basically represents a sparse graph of music item similarities that can act as either the music similarity graph 205, or as an input to that graph via the aforementioned graph node equivalency module 360.

In general, the similarity quantifier described in the copending U.S. patent application operates by using a combination of media identification techniques to gather statistical information for characterizing one or more media streams. The gathered statistics include at least the identity (either explicit or implicit) and relative positions of media objects, such as songs, embedded in the media stream, and whether such objects are separated by other media objects, such as station jingles, advertisements, etc. This information is then used for inferring statistical similarity estimates between media objects in the media streams as a function of the distance or adjacency between the various media objects.

The inferential similarity analysis is generally based on the observation that objects appearing closer together in a media stream authored by a human disk jockey (DJ), or the like, are more likely to be similar. Specifically, it has been observed that many media streams, such as, for example, most radio or Internet broadcasts, frequently play music or songs that are complementary to one another. In particular, such media streams, especially when the stream is carefully compiled by a human DJ or the like, often play sets of similar or related songs or musical themes. In fact, such media streams typically smoothly transition from one song to the next, such that the media stream does not abruptly jump or transition from one musical style or tempo to another during playback. In other words, adjacent songs in the media stream tend to be similar when that stream is authored by a human DJ or the like. Consequently, if a monitored radio station plays song A followed by song B, then the playlist graph 310 will have a link (edge) between nodes representing song A and song B.

Collaborative filtering-based similarity graphs 320 are another option. As is well known to those skilled in the art, many collaborative-filtering (CF) methods use the behavior of users in order to generate pair-wise similarity values between items. For example, a CF system might identify that users who listen to song A are much more likely to listen to song B than those who have not listened to song A; the pair-wise similarity measure between A and B in this case might be the corresponding increase in probability. A collaborative-filtering graph 320 can thus be constructed from the pair-wise similarity values derived from the collaborative-filtering method. There are many CF techniques that can be used to generate such pair-wise similarity values, these techniques are well known to those skilled in the art, and will not be described in detail herein.

Metadata-based similarity graphs 330 are constructed from music metadata 340 via a metadata graph construction module 350. In general, metadata for music typically includes information such as genre, mood, artist, title, track, etc. If the metadata 340 for two items match closely enough, then the metadata graph construction module 350 will create a link between them, and produce the metadata graph 330.

Any such graphs, editorial, playlist, CF or metadata, can individually act as the music similarity graph 205. However, in the case where more than one data source is used, a graph node equivalency module 360 is used to identify whether two nodes in different graphs correspond to the same musical item. In one embodiment, this node matching is accomplished using methods, such as, for example, conventional fuzzy text matching (since each node is identified by artist, track title, and/or album). Alternatively, a musical item may be identified with a unique global ID across all data sources. In this case, there will be a direct one-to-one correspondence between various nodes from different graphs, as a function of the unique identifier.

3.1.1 Weighting Links in Similarity Graphs:

In a music similarity graph including nodes for artists, albums, and tracks, there are six basic types of links or connections that can be made. In particular, the connections in the music similarity graph include some or all of the following links (i.e., sparse graph edges):

1) Artist to Artist connections;
2) Artist to Album connections;
3) Artist to Track connections;
4) Album to Album connections;
5) Album to Track connections; and
6) Track to Track connections.

In one embodiment, some or all of the aforementioned links are weighted to provide further customization of the coordinate vectors. In particular, weighting of these links serves to increase or decrease a relative distance between various nodes in the music similarity graph, thereby changing the embedding of the various nodes into music space. Consequently, the coordinate vectors resulting from the embedding process described in Section 3.2 are also modified. Therefore, modification of these weights provides a capability for tuning the playlists and clusters of similar music that are derived from the coordinate vectors.

Further, while it is possible to manually weight each individual link in the music similarity graph, it has been observed that providing global weights for each class of links operates to provide an adequate level of control over the resulting coordinate vectors. For example, when using such global weights, each class of links, such as, for example, artist to artist links, or album to track links, would receive a single global weight, which can then be adjusted to achieve the desired results. However, in one embodiment, involving metadata-based similarity graphs, the weights of each link are automatically assigned to the various links as a function of how well the metadata matches between any two nodes in the music similarity graph, with higher weights being assigned to nodes having better matches.

Further, in one embodiment, user preferences may be considered in weighting particular entries. For example, in the case where users particularly dislikes a particular artist or song, nodes representing that artist or song can be weighted in such a way as to increase the distance of that artist or song to other nodes in the music similarity graph. Conversely, in the case where users particularly likes a particular artist or song, nodes representing that artist or song can be positively weighted in such a way as to decrease the distance of that artist or song to other nodes in the music similarity graph.

3.1.2 Automatic Optimization of Weighted Links:

As is well known to those skilled in the art, a "simplex" is a geometric figure defined by a number of points equal to one more than the number of dimensions in a space. A vertex is simply a corner of the simplex, with the collection of those points, and the links between them defining the simplex. A weighted graph of music similarities has a number of parameters (e.g., the weights for each class of links as described in section 3.1.1). These parameters can form the underlying space for conventional simplex optimization methods, such as, for example, classic Nelder's simplex optimization methods. These methods can be applied to optimize the parameters for the weighted graph: the parameters can be chosen to optimize a cost function. Such simplex optimization methods are well known to those skilled in the art, and will only be discussed generally herein.

The idea behind the use of these simplex optimization methods by the Music Mapper is to automatically adjust the various weights so the playlists generated from one or more seed songs will maximally match hand authored music playlists. Consequently, such authored playlists are used as a target in performing the automatic weight adjustments of the simplex optimization.

3.2 Embedding Music into Multi-Dimensional Space:

Multidimensional scaling (MDS) is a well known branch of statistics that deals with embedding objects in a relatively low-dimensional Euclidean space based on a matrix of similarities. More specifically, MDS algorithms typically take a matrix of dissimilarities $\delta_{rs}$ and find vectors $\vec{x}_r$ whose inter-vector distances $d_{rs}$ are well matched to $\delta_{rs}$. In the case of the Music Mapper described herein, these vectors, $\vec{x}_r$, correspond to the coordinate vectors provided as the table of coordinates for representing the embedding of each music item in the music similarity graph into music space.

It should be noted that a dimensionality of any desired order may be used for embedding the music items represented by the music similarity graph into music space. However, using a dimensionality of too low an order will typically increase the "stress" or distortion of the resulting embedding. Lower stress values with MDS-type embedding indicate a better data fit. From a mathematical standpoint, non-zero stress values occur for only one reason: insufficient dimensionality. That is, for any given dataset, it may be impossible to perfectly represent the input data in two or other small number of dimensions. On the other hand, any dataset can be perfectly represented using n−1 dimensions, where n is the number of items scaled. As the number of dimensions used goes up, the stress must either come down or stay the same.

From a substantive standpoint, stress may be caused either by insufficient dimensionality, or by random measurement error. In the music similarity graphs described herein, inherent uncertainty in manually specifying an exact similarity between the nodes equates to this random measurement error. However, it is not necessary that an MDS map have zero stress in order to be useful. In fact, as is well known to those skilled in the art, any embedding map that has non-zero stress includes distances that are, to some degree, distortions of the input data. The distortions may be spread out over all pairwise relationships, or concentrated in just a few particularly badly embedded pairs. In general, however, longer distances tend to be more accurate than shorter distances, so larger patterns are still visible even when stress is relatively high.

Taking such considerations into account, in a tested embodiment, a dimensionality on the order of about 20 was used, with each coordinate vector being represented by 20 floating point numbers. However, no special significance should be attached to the dimensionality of this tested embodiment.

3.2.1 Conventional Multidimensional Scaling (MDS):

There are three typical approaches for applying MDS to large sparse dissimilarity matrices:

First, a number of typical approaches operate by directly applying an MDS algorithm to the sparse graph. However, not all MDS algorithms require a dense matrix $\delta_{rs}$. In fact, some of these algorithms can operate on a sparse matrix by ignoring missing terms in its cost function. Unfortunately, such algorithms cannot reliably reconstruct the position of known data points given a sparse matrix of dissimilarities such as the music similarity graphs described herein.

Second, other conventional MDS approaches operate by using a graph algorithm to generate a full matrix of dissimilarities. For example, one such technique operates to identify an embedding of a sparse set of dissimilarities into a low-dimensional Euclidean space. Such techniques often employ shortest path algorithms to find the shortest distance between any two points in a graph having N data points and then use the resulting N×N distances as input to a full MDS algorithm. Once in the low-dimensional space, data can easily be interpolated or extrapolated. Note that conventional systems using values on the order of about N=1000 are dealing with rather large matrices. Consequently, as is well known to those skilled in the art, the computational complexity for embedding the corresponding data inhibits their use on large data sets because of the very large numbers of graph traversals required to embed the data.

Third, other conventional MDS approaches operate to by using a graph algorithm to generate a thin dense rectangle of distances. In particular, such techniques operate to generate an interesting subset of n rows, n<<N, rather than generating the entire N×N matrix of dissimilarities. For example, one class or family of MDS algorithms, referred to herein as "Rectangular Dijkstra" (RD) MDS algorithms operate on a dense rectangle of distances, filled in by Dijkstra's algorithm. The first published member of this family was the well known Landmark MDS (LMDS). LMDS operates on a number of rows proportional to the embedding dimensionality, d. Thus, while such methods reduce the computational overhead of embedding, there is still significant room for improvement.

3.2.2 Fast Sparse Embedding (FSE):

Conventional LMDS requires the solution to an n×n eigenproblem, which, unfortunately, is computationally expensive, especially for larger values of n. To avoid this eigenproblem, a new type of RD MDS process, referred to herein as "Fast Sparse Embedding" (FSE), is introduced. Further, in contrast to LMDS, FSE provides a novel adaptation of a conventional technique, referred to as "FastMap." In general, FastMap provides an MDS algorithm that takes a constant number of rows of the dissimilarity matrix. FastMap then iterates over the dimensions of the projection, fixing the position of all vertices in each dimension in turn. FastMap thus approximates the solution of the eigenproblem through deflation. Note that the FastMap technique is described in a publication entitled: "*Fastmap: A Fast Algorithm for Indexing, Data-Mining and Visualization of Traditional and Multimedia Databases,*" In *Proc. ACM SIGMOD*, pages 163-174, 1995, by C. Faloutsos and K.-I. Lin, the subject matter of which is incorporated herein by this reference.

In particular, the new FSE technique operates to embed the points of the music similarity graph into the music space as follows:

Consider the first dimension. Two vertices ($\vec{x}_a, \vec{x}_b$) are chosen, and the dissimilarity from these two vertices to all of the other N vertices i are computed: ($\delta_{ai}, \delta_{bi}$). In FSE, these dissimilarities are computed by Dijkstra's algorithm.

During the first iteration (dimension), the distances ($d_{ai}, d_{bi}$) are set equal to the dissimilarities.

The 2N distances can determine the location of the vertices along the dimension up to a shift, through use of the law of cosines:

$$x_i = \frac{d_{ai}^2 - d_{bi}^2}{2d_{ab}} \qquad \text{Equation 3}$$

For each subsequent dimension, two new vertices are chosen and new dissimilarities ($\delta_{ai}, \delta_{bi}$) are computed using Dijkstra's algorithm. The subsequent dimensions are assumed to be orthogonal to previous ones, so the distances for dimension N are computed from the dissimilarities via Equation 4, as follows:

$$\delta_{ai}^2 = d_{ai}^2 + \sum_{n=1}^{N}(x_{an} - x_{in})^2 \Rightarrow d_{ai}^2 = \delta_{ai}^2 - \sum_{n=1}^{N}(x_{an} - x_{in})^2 \qquad \text{Equation 4}$$

Thus, each dimension accounts for a fraction of the dissimilarity matrix, analogous to classical principal component analysis (PCA). Note that, except for $d_{ab}$, all other distances are needed as distance squared, so only one square root for each dimension is required. The distances produced by Dijkstra's algorithm are the minimum graph distances modified by Equation 4 in order to reflect the projection used so far.

For each dimension, the vertices a and b are heuristically chosen to be as far apart as possible. In order to avoid an $O(N^2)$ step in choosing a and b, an arbitrary starting point is selected as the current point, the point furthest away from the current point found, and the current point is then set to the farthest point. This process repeats iteratively to converge on a solution. The computational overhead of each Dijkstra call (including Equation 4) is $O(M \log N + Nd)$ calculations, so the complexity of the entire algorithm is $O(Md \log N + Nd^2)$ calculations.

Figure 4:
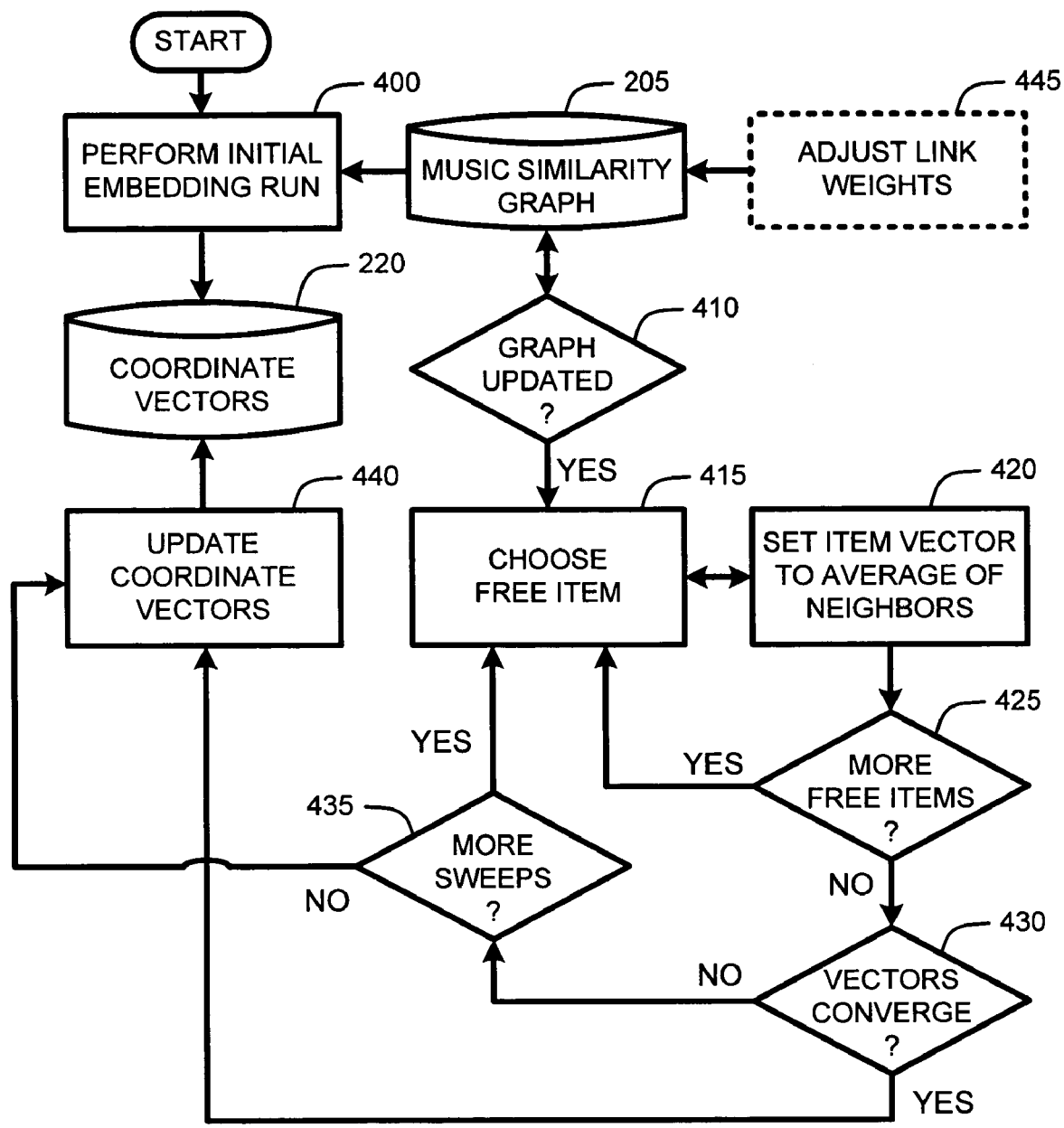
FIG. 4 illustrates an exemplary operational flow diagram for recursively embedding the nodes of a music similarity graph into music space, as described herein.

3.2.3 Recursive Embedding Updates:

FIG. 4 illustrates the aforementioned recursive embedding technique employed by the Music Mapper for recursively embedding the nodes of the music similarity graph into music space. It should be noted that the boxes and interconnections between boxes that are represented by broken or dashed lines in FIG. 4 represent alternate embodiments of the recursive embedding functionality of the Music Mapper, and that any or all of these alternate embodiments, as described herein, may be used in combination with other alternate embodiments that are described throughout this document.

In general, as illustrated by FIG. 4, an initial embedding run 400 is first performed on the music similarity graph 205. In addition, as described in Section 3.1, the links between the various nodes may be adjusted 445, either manually or automatically prior to performing the initial embedding run 400. In any case, the initial embedding run 400 operates by using MDS embedding techniques such as LMDS or FSE techniques described in Section 3.2. In one embodiment, this initial embedding operates the entire music similarity graph to embed the graph nodes into music space. However, some music, albums or artists, and thus the relationships or similarities between them are fairly well known, while others are not known very well. Consequently, in one embodiment, the initial embedding run 400 is performed on a limited set of well known objects, such as a number of well-known artists for generating the coordinate vectors.

Once the well known artists have been embedded into music space, then the remaining nodes are embedded using the recursive embedding process outlined in the remainder of FIG. 4. Note that this is the same as the case where the music similarity graph 205 is updated 410 after the initial embedding 400.

In general, after the initial embedding run 400, a relaxation algorithm for minimizing a constrained quadratic cost function is used to embed the new (or initially non-embedded) nodes of the music similarity graph 205 into music space. Any items that appear in the table of coordinate vectors 220 are considered to be "fixed." Conversely, any item that appears in the graph 220 but not in the table 220 is considered "free" and the recursive embedding process illustrated by FIG. 4 assigns it a coordinate vector.

In particular, once the music similarity graph has been updated 410 with new items (or additional non-embedded items remain), one of those free items is chosen 415, either randomly, or by sweeping through the free items in some predetermined order. A coordinate vector for that selected item is computed 420 as the average, or weighted average, of all of the coordinate vectors of all items connected to that item in the graph. (Note that in a first pass, connected items not already embedded will not have an assigned coordinate vector to contribute to this average). This average is computed over all free and fixed neighbors in the graph, by simply repeating the selection process 415 and the averaging process 420 until there are no more free items 425 to be processed.

Once a first sweep (415, 420, and 425) through the free items has been completed, a determination is made as to whether the assigned coordinate vectors have converged 430 to a stable embedding solution. For example, after one complete sweep through the free items, the convergence check 430 is performed by determining an amount that all of the new items moved during the preceding pass of recursive embedding (415, 420, and 425). If the average or maximum movement of the items is less than an adjustable or pre-specified threshold, then the coordinate vectors assigned to the new items are presumed to have converged 430 to a stable embedding solution. Alternatively, if a large majority of the items have moved by less than a threshold, the solution can be considered to have converged.

If convergence has not been achieved, the number of sweeps already performed is examined to determine whether to perform additional 435 recursive embedding sweeps (415, 420, and 425). If more sweeps 435 are to be performed, then the process described above is repeated for all of the "free" items assigned coordinate vectors in the previous recursive embedding sweep. The only difference between the first sweep and all subsequent sweeps is that in the second and subsequent sweeps, all of the free items will begin with some initial coordinate vector value which will influence its connected free neighbors. As noted above, these recursive embedding sweeps continue either until convergence is reached 430, or until a pre-set number of sweeps 435 have been performed.

In the case that a convergent embedding solution 430 has been achieved, the coordinate vector assigned to each free item is used to update 440 the table of coordinate vectors 220. As this point, those free items then become fixed items with respect to future updates to the music similarity graph 205. Alternatively, items that were not considered converged can be set free for future updates to the music similarity graph, with the converged items then being held fixed.

3.3 Distance Measurements Between Coordinate Vectors:

In general, the "distance" between any two vectors v and w in the music similarity graph is the length of the difference vector v−w. In the case of the Music Mapper described herein, this distance measurement is taken as a measure of similarity between any two music objects. As is well known to those skilled in the art, there are a large number of conventional techniques for determining the distance between two vectors. For example, some of these well known distance metrics include the Manhattan or L1 distance, the Euclidian or L2 distance, the Chebychev distance, the Mahalanobis distance, etc., just to name a few. It should be understood that the Music Mapper described herein is fully capable of operating with any conventional vector distance metric. Note that as these distance metrics are well known to those skilled in the art, they will not be described in detail herein.

3.4 Playlist Generation:

As noted above, in one embodiment, the Music Mapper operates to generate music playlists given one or more seed songs. These seed songs can be chosen either randomly, or specifically, via a user interface. In general, idea is to create a list of similar songs that avoids abrupt transitions in the theme or mood of the music included in the playlist. In various embodiments, these playlists can then be edited, copied, saved, combined, or used to initiate playback of the songs included in the list.

Further, as described above, in one embodiment, the playlists are generated in the context of a server-client relationship where the server embeds the music entries of the music similarity graph and generates the corresponding coordinate vectors, and the client retrieves coordinate vectors corresponding to a local music library, and then uses a measurement of the distance (see section 3.3) between those vectors in generating local playlists. However, for purposes of explanation, the following discussion will describe local client generation of playlists assuming that the client already has the coordinate vectors corresponding to a local library of music.

Figure 5:
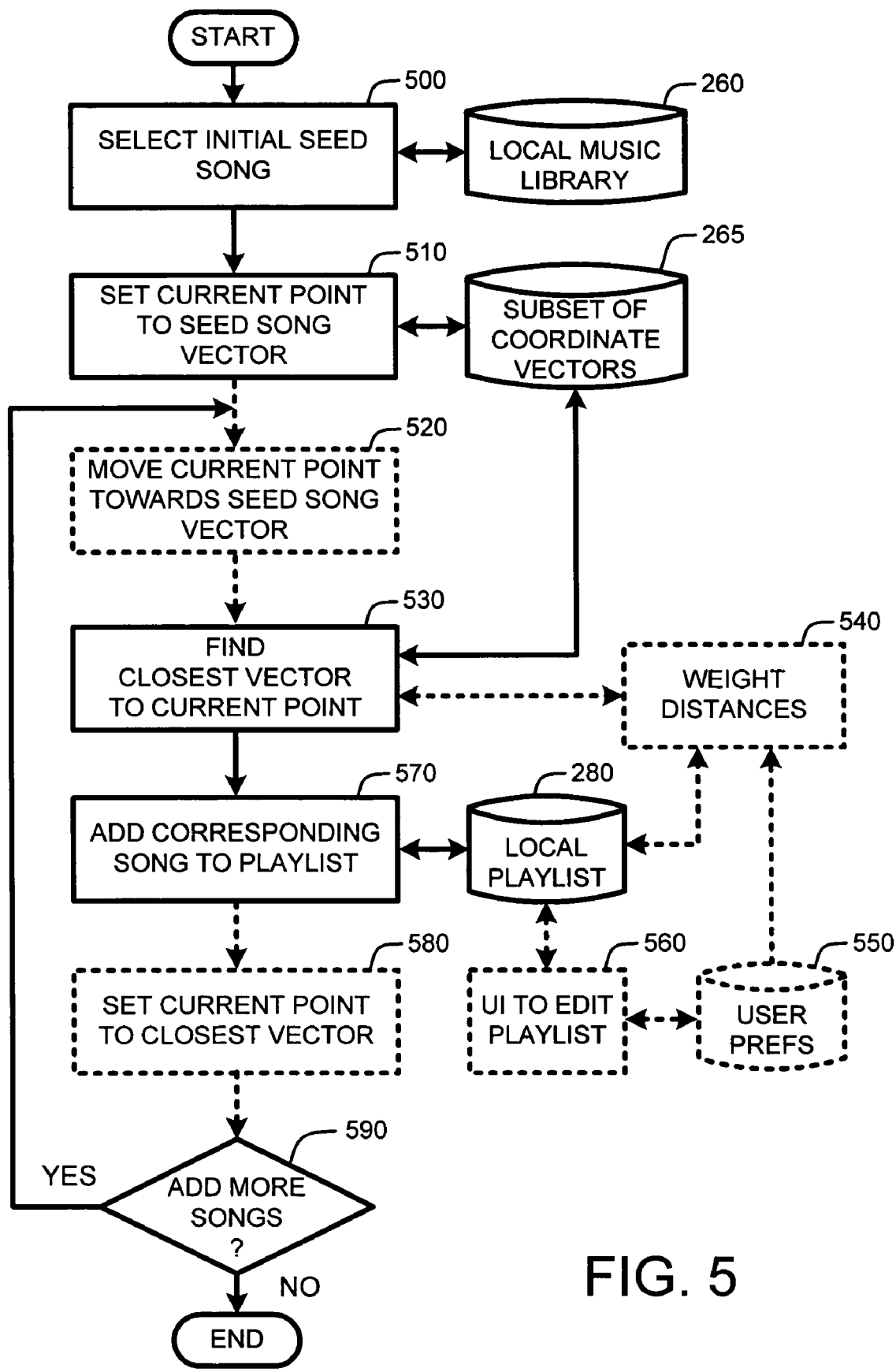
FIG. 5 illustrates an exemplary operational flow diagram for generating a playlist from a subset of coordinate vectors using a single seed song, as described herein.

3.4.1 Playlists Based on a Single Seed Song:

In general, as illustrated by FIG. 5, playlist generation is accomplished as a function of the similarity of music items, which is determined as a function of the distance between the corresponding coordinate vectors. The playlist generation process illustrated in FIG. 5 uses the table of coordinates 265 when a single initial seed song is selected 500 by a user. In one embodiment, the basic idea illustrated by FIG. 5 is idea is to "buzz" around the seed song, selecting songs that are similar to each, but also similar to the seed song. In an alternate embodiment, the initially selected seed song is only used as an initial starting point. Consequently, in this second embodiment, the playlist will tend to drift away from the initial seed song over time.

In particular, as illustrated by FIG. 5, playlist generation based on a single seed song begins by selecting the initial seed song 500 from the local music library 260. A current music space point is then set 510 to be the coordinate vector 265 corresponding to the initial seed song. In selecting the next song for the playlist, music space is searched to find the closest vector 530 to the current music space point. Note that in one embodiment, the distances from particular points to other points in music space is weighted 540.

In one embodiment, this weighting 540 is performed as a function of user specified preferences 550. In general, where a user expresses likes or dislikes for particular artists, albums, or tracks (either directly, or through an automatic evaluation of user interaction with items in the local music library), then those preferences will be used to increase or decrease a weight associated with corresponding music items. For example, where a user likes a particular song, and frequently plays that song, a weight will be assigned to coordinate vector for that song which will decrease its "distance" to every other song in the local music library 260. Conversely, the coordinate vector corresponding to a song that the user dislikes will be assigned a weight which will increase its distance to every other song in the local music library 260.

It should also be noted that in one embodiment, songs already in the playlist are either excluded from further consideration, or weighted in such a way as to increase their distances to other songs so that it is unlikely that they will be repeated in the playlist. This embodiment is useful for avoiding overly repetitive playlist construction. In a similar embodiment, songs by recently played artists are weighted to have artificially higher distances than their coordinate vectors would indicate, with that weight then being slowly removed as a function of time from the last occurrence of the artist in the playlist. This embodiment is useful for ensuring that the playlist includes a variety of artists without becoming filled with similar songs by a limited number of artists.

In any case, once the closest coordinate vector to the current music space point is identified 530, the corresponding music item from the local music library 260 is added 570 to the local playlist 280. In one embodiment, a user interface 560 is provided to allow user browsing and editing of the playlist 280. In one embodiment, the current music space point is then set 580 to the coordinate vector of the selected song. With this embodiment, the playlist will tend to drift away from the initial seed song as more songs are added 590. Consequently, in a related embodiment, the current music space point is then moved 520 to a point in music space (which doesn't necessarily correspond to a musical item) in a direction towards the initial music space point. In a tested embodiment, the move 520 was made to a point reflecting an average (or weighted average) between the current point and the initial point. However, any amount of travel towards the initial point will tend to keep the music selection in the general neighborhood of the initial point. In selecting the next song for the playlist, music space is then simply searched again to find the closest vector 530 to the current music space point.

The playlist generation process described above then continues to populate the playlist until terminated by the user, or until reaching some other criterion, such as the number of songs in the playlist, amount of time in the playlist, number of kilobytes of storage needed by music in the playlist.

Figure 6:
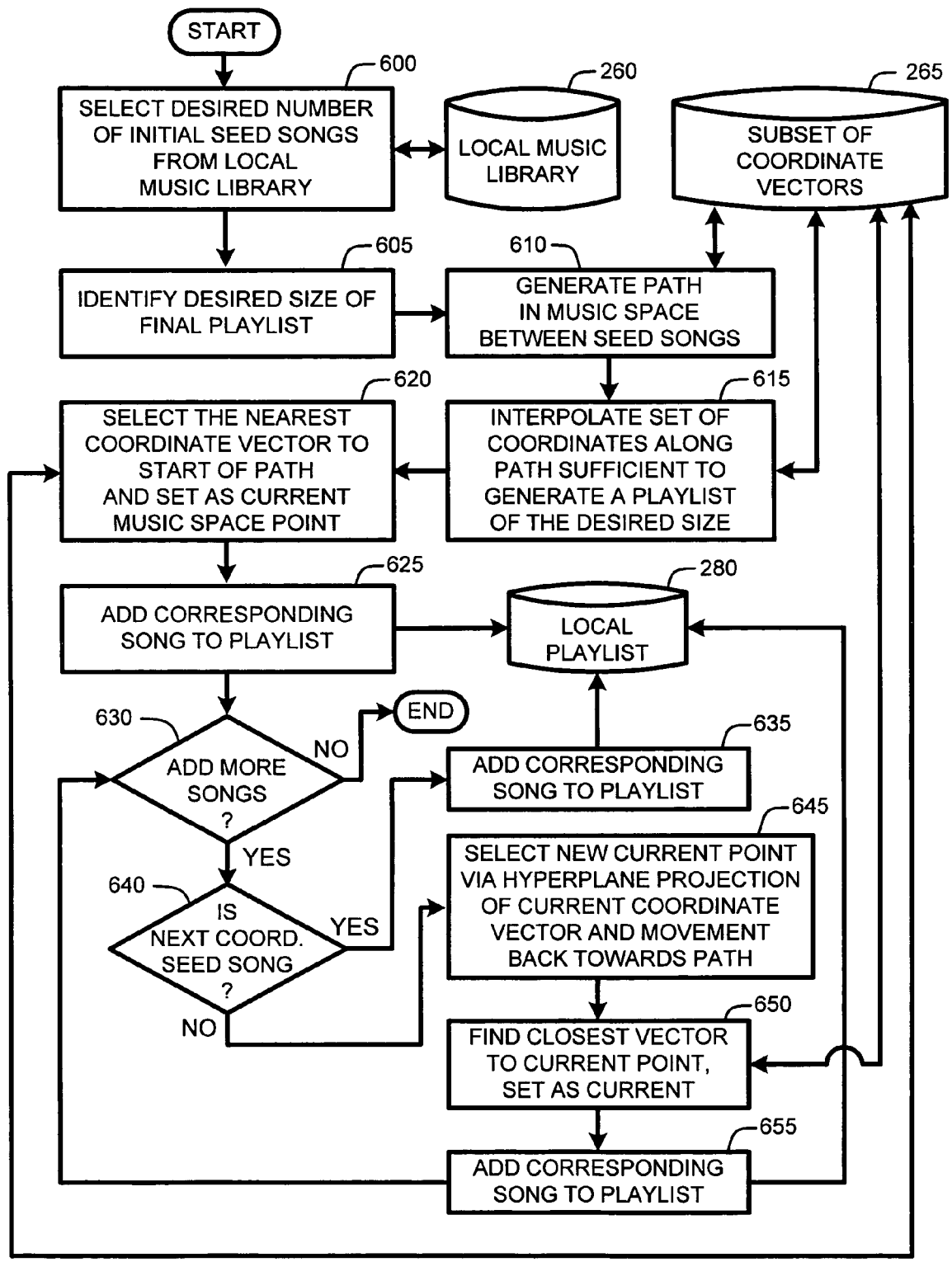
FIG. 6 illustrates an exemplary operational flow diagram for generating a playlist from a subset of coordinate vectors using multiple seed songs, as described herein.

3.4.2 Playlists Based on Multiple Seed Songs:

In general, as illustrated by FIG. 6, playlist generation with multiple seed songs is also accomplished as is accomplished as a function of the similarity of music items, which is determined as a function of the distance between the corresponding coordinate vectors. In operation, generating playlists given multiple seed songs operates in a fashion similar to that described above for single seed songs. However, one primary difference is that the playlist is generated by identifying a number of closest coordinate vectors along a multidimensional path linking the selected seed songs. In other words, the basic idea is to smoothly interpolate between the songs in multidimensional space.

In particular in one embodiment, playlist generation begins by selecting a desired number of initial seed songs 600 from the local music library 260. Next, a desired size 605 of the final playlist is identified. In general, this desired size is based on either the number of songs desired, or an approximate playlist length, as specified via a user interface. Once the seed songs have been selected 600 and the size of the playlist specified 605, a multidimensional path is generated 610 in music space between the selected seed songs. Note that this path is inherently multidimensional since the coordinate vectors 265 corresponding to the selected seed songs are themselves multidimensional.

In various embodiments, the order of the seed songs along the multidimensional path is determined in a variety of ways. For example, in one embodiment, the seed songs are ordered in the same order that they are selected, and the coordinate vectors simply being connected to generate the path. In another embodiment, a shortest path analysis is used to identify a shortest path between the seed songs. In yet another embodiment, a random path is generated between the selected seed songs.

Regardless of how the path is generated 610, once the path between the seed songs is available, the next step is to use the desired playlist length to estimate a total number of songs based on an average song length (unless that number is already specified), and then to use that number in interpolating 615 a set of coordinates along the path for use in selecting songs for generating a playlist of the desired size. For example, assuming that three seed songs are selected, and the desired playlist size requires twenty songs, then seventeen evenly spaced points will be interpolated along the path between the fixed points corresponding to the three seed songs.

Next, actual construction of the path begins by selecting the nearest coordinate vector to the start of the path, and setting that nearest coordinate vector as a current music space point 620. Note that in one embodiment, this point will correspond exactly to the seed song at the beginning of the path. The song corresponding to that current music space point is then added 625 to the local playlist 280. A determination is made as to whether additional songs are to be added 630 to the playlist. In other words, a check 630 is made to determine whether there are there any more coordinates along the path that need to be considered for generating the playlist 280. If no more songs are to be added 630, then the process terminates, and the playlist 280 is complete.

However, if additional songs are to be added 630, then a check is made to determine whether the next path coordinate corresponds 630 to a seed song. If it does, then that seed song is simply added 635 to the local playlist 280. However, if the next coordinate along the path does not correspond to a seed song, then rather than using that path coordinate directly for finding the closest coordinate vector, and thus the closest song, it is important to find a closest song in the direction of the next coordinate along the path, so as to constantly move forward along the path. Therefore, a new current point is computed 645 from a combination of the current path coordinate, and the current music space point corresponding to the coordinate vector of the last song added to the playlist 280.

In particular, computation 645 of the new current point is achieved by first projecting the current coordinate vector of the last song added to the playlist into the hyperplane that passes through the location of the current path coordinate, and is perpendicular to the interpolated path between the preceding seed song and the succeeding seed song along that path. Then, computation 645 of the new current point is finished by moving the projected point directly towards the current coordinate on the interpolated path by some amount. In one embodiment, the amount of movement towards the current coordinate is determined as the average (or weighted average) of projected point and the current coordinate along the path. This movement towards the interpolated path completes computation 645 of the new current point.

Given this new current point, the next step is to simply find 650 the closest coordinate vector 265 to the new current point, and then to add 655 the corresponding song to the playlist 280. The process for adding additional songs to the playlist 280 then repeats, beginning with step 630, as described above, by first checking to see if more songs are to be added to the playlist as described above.

Note that as described above in Section 3.4.1, with respect to generating playlists from a single seed song, various embodiments are also provided with respect to generating the playlists from multiple seed songs. For example, as described above with respect to FIG. 5, in one embodiment, songs that are previously in the playlist are excluded. In another embodiment, songs by recently played artists are penalized to be artificially farther than the coordinate vector table would indicate. In addition, in yet another embodiment, distance weightings based on user preference as to particular artists, albums or tracks are used to influence selection of the closest coordinate vector (and corresponding song) to the current music space point.

3.5 Clustering Music Similarity Vectors:

As noted above, in one embodiment, rather then generating playlists based on coordinate vector distances, a statistical clustering process is instead used for generating clusters of similar artists, albums, and/or tracks. These clusters are then useful for a number of purposes, including, for example, cataloging or bulk labeling of music tracks (by genre, artist, style, etc.), and generation of playback clusters based on selection of one or more seed song (i.e., playing some or all songs in the same clusters as the selected seed songs).

Figure 7:
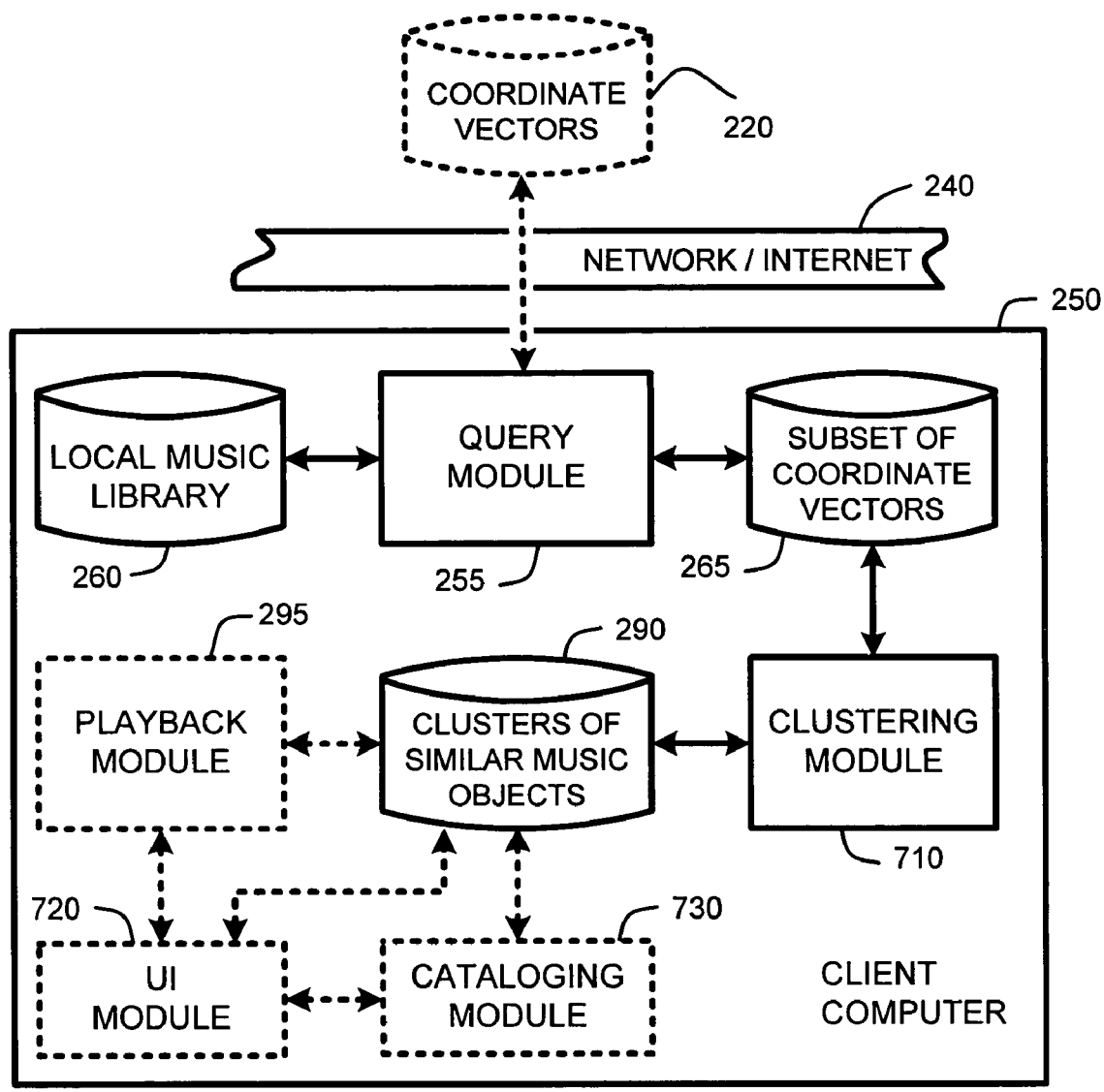
FIG. 7 illustrates an exemplary operational flow diagram for generating clusters of similar music objects from a subset of coordinate vectors, as described herein.

For example, as illustrated by FIG. 7, in the server-client case described above with respect to FIG. 2, the subset of coordinate vectors 265 corresponding to the local music library 260 are retrieved via the query module 255 from the set or table of coordinate vectors 220 generated by the server. Alternately, as described above, the coordinate vectors can be generated locally using the music similarity graph as described above.

In any case, once the client has the subset of coordinate vectors 265 corresponding to the local music library 260, the next step is to use a clustering module 710 generate the clusters of similar music objects 290. As noted above, these clusters can be clusters of similar artists, similar albums, or similar tracks, depending upon the links available in the music similarity graph used to generate the coordinate vectors 220.

In general, the clustering module 710 operates to generate the clusters of similar music objects 290 using the coordinate vectors corresponding to each artist, album, and/or track in the local music library, depending upon what type of clusters the user is interested in. Clustering algorithms typically use a similarity measure to determine if two items should belong to the same group. In one embodiment, the clustering module 710 described herein operates to generate the clusters 290 using Euclidean distances computed from the music similarity coordinate vectors. Any of a number of conventional clustering techniques, such as, for example, conventional "isodata clustering" or conventional "agglomerative clustering with maximum-distance linkage," can be used to generate the clusters 290 given the coordinate vectors 265.

However, in another embodiment, the clustering module 710 used a new iterative clustering process for generating the clusters 290. In general, this new iterative clustering process performs a recursive clustering of the desired class of objects, such as for example, the artist class, album class, or track class. For example, to cluster similar artists, the clustering module 710 first places each artist into its own unique cluster. Then, a determination is made as to how many artists fall within a first minimum threshold distance (relative to the corresponding coordinate vectors 265 for those artists) of each artist. The artist with the largest number of other artists within the first minimum threshold distance is then identified, and a first cluster is formed with that artist and all of the other artists falling within the first minimum threshold distance. All artists in this first cluster are then removed from further consideration, and the process of generating a next cluster is repeated in exactly the same manner as described for generation of the first cluster. This process then repeats until all artists have been included in a cluster (even if one or more of the artists are in clusters by themselves).

Note that the first minimum threshold distance for clustering music objects such as artists is determined experimentally and tends to be application specific. For example, a small threshold distance results in a lot of small clusters where the similarity between items is high. Conversely, a larger threshold distance reduces the number of clusters, but also reduces the similarity between the items within the cluster. Consequently, in an application where the threshold is set low to form clusters of very similar items, the end result can be many relatively small or even one-item clusters. To address this issue, in another embodiment, the number of these small clusters is reduced by performing a second pass over the cluster data, using an additional clustering step.

In particular, in this further embodiment, small clusters, such as clusters with only one, or relatively few, music objects are themselves clustered. For example, to continue with the example of artists clustering described above, the small clusters (where the number of entries in the cluster falls below some minimum size threshold), each of those clusters is merged with its nearest small cluster neighbor, so long at that nearest small cluster neighbor falls within a second minimum distance threshold. Once merged, the merged clusters are then removed from further consideration for additional cluster merges (unless the merged size still falls below the minimum size threshold).

In related embodiments, conventional clustering techniques, such as, for example, conventional k-means clustering, was used to merge groups of the small clusters as a function of the corresponding coordinate vectors. However, in tested embodiments of the clustering module 710, it was observed that nearest small neighbor iterative merging process described above tended to produce better clustering results.

Regardless of the clustering techniques used by the clustering module 710, the end result is the set of clusters of similar music objects 290. In various embodiments, this set of clusters of similar music objects 290 is then used to accomplish various tasks via interaction with the clusters a user interface module. For example, users with a large local music library 260 tend to have difficulty keeping their music collection in order. In particular, manually organizing the music into groups of similar items or labeling tracks is a tedious task for someone with even a few hundred tracks. Consequently, in one embodiment, a cataloging module 730 automatically catalogs the contents music library 260 as a function of the clusters of similar music objects 290 for organizing tracks into partitions of similar music or to bulk label those tracks.

In another embodiment, as noted above, the clusters of similar music objects 290 are used to automatically create or provide playback (via the playback module 295) of one or more clusters of music objects. In general, the clusters used to populate the playlists are chosen either at random, or via user selection of a particular music object (i.e., artist, track, or album). Other music objects in the same cluster as the selected music object are then provided either randomly, or as a group for immediate playback via the playback module 295, or as a playlist which can be edited via the user interface module 720, or stored for later use, as desired.

The foregoing description of the invention has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the systems and methods described herein. It is intended that the scope of the invention be limited not by this detailed description, but rather by the claims appended hereto.

What is claimed is:

1. A system for generating a playlist of media objects, comprising using a local client computer to perform steps including:

retrieving a subset of coordinate vectors corresponding to locally available media objects from a remote server computer;

selecting a media object from the locally available media objects, adding the selected object to a playlist, and setting a corresponding one of the coordinate vectors as a current point;

searching the subset of coordinate vectors to locate a coordinate vector having a closest distance to the current point, adding the media object corresponding to the located coordinate vector as a next media object in the playlist, and setting a point corresponding to the located coordinate vector as the current point;

until the playlist reaches a desired length; and storing the playlist to a physical computer readable medium.

2. The system of claim 1 further comprising excluding one or more individual coordinate vectors from the search of the retrieved coordinate vectors when any of those individual coordinate vectors correspond to a media object already added to the playlist.

3. The system of claim 1 further comprising weighting distances between coordinate vectors prior to performing the search of the retrieved coordinate vectors.

4. The system of claim 3 wherein weighting distances between coordinate vectors comprises increasing distances to the current point from coordinate vectors related to media objects already added to the playlist.

5. The system of claim 3 wherein weighting distances between coordinate vectors comprises modifying distances to the current point from one or more coordinate vectors related to media objects having associated user preferences.

6. The system of claim 1 wherein setting the point corresponding to the located coordinate vector as the current point comprises computing a weighted average of the current point and the located coordinate vector, and setting the computed average as the current point.

7. The system of claim 1 further comprising editing the playlist via a user interface.

8. A computer storage media having computer executable instructions stored thereon for generating a media object playlist from a set of coordinate vectors, comprising:
   providing a set of unique multidimensional coordinate vectors, each coordinate vector corresponding to a unique media object in a set of locally available media objects;
   selecting two or more media objects from the set of locally available media objects;
   determining a total number of media objects sufficient to generate a media object playlist of an approximate desired size;
   computing a multidimensional path between the coordinate vectors corresponding to the selected media objects, said path further including points along a full length of the path such that the total number of points along the path is equal to the total number of media objects sufficient to generate the media object playlist of the approximate desired size; and
   beginning at the start of the multidimensional path, populating the media object playlist by selecting media objects for addition to the playlist as a function of the corresponding coordinate vectors and the points along the computed multidimensional path.

9. The computer storage media of claim 8 wherein selecting media objects for addition to the playlist comprises:
   adding a media object to the playlist whenever a point along the multidimensional path corresponds to one of the selected media objects;
   identifying the closest coordinate vector to a computed point in multidimensional space for each point along the multidimensional path that does not correspond to one of the selected media objects and adding the media object corresponding to the closest coordinate vector to the playlist.

10. The computer storage media of claim 8 wherein at least one media object is excluded from addition to the playlist if that media object has already been added to the playlist.

11. The computer storage media of claim 8 wherein distances to coordinate vectors from each point along the multidimensional path are weighted to increase the distances for coordinate vectors related to media objects already added to the playlist.

12. The computer storage media of claim 8 wherein distances to coordinate vectors from each point along the multidimensional path are weighted to reflect user preferences relating to particular media objects.

13. The computer storage media of claim 8 wherein providing the set of unique coordinate vectors comprises retrieving the coordinate vectors corresponding to the set of locally available media objects from a remote server computer.

14. The computer storage media of claim 8 wherein computing the path between the selected media objects comprises:
   ordering the coordinate vectors associated with the selected media objects in order of selection of the media objects to create fixed points on the multidimensional path; and interpolating all remaining points between the fixed points to create the total number of points along the path sufficient to generate the media object playlist of the approximate desired size.

15. A method for generating a playlist of media objects, comprising using a computing device for:
   compiling a list of locally available media objects;
   querying a remote server computer for retrieving a set of coordinate vectors corresponding to the locally available media objects; and
   generating a media object playlist of a desired size as a function of computed distances between the retrieved coordinate vectors and a selected one of the locally available media objects by;
   adding the selected media object to the start of the playlist and setting a corresponding one of the retrieved coordinate vectors as a current point,
   for each current point, searching the retrieved coordinate vectors to locate a coordinate vector having a closest distance to the current point, adding the media object corresponding to the located coordinate vector as a next media object in the playlist, and setting a point corresponding to the located coordinate vector as the current point until the playlist reaches a desired size.

16. The method of claim 15 further comprising excluding one or more individual coordinate vectors from the search of the retrieved coordinate vectors when any of those individual coordinate vectors correspond to a media object already added to the playlist.

17. The method of claim 15 further comprising weighting the computed distances between coordinate vectors.

18. The method of claim 17 wherein weighting the computed distances between coordinate vectors comprises increasing distances to the current point from coordinate vectors related to media objects already added to the playlist.

19. The method of claim 17 wherein weighting the computed distances between coordinate vectors comprises modifying distances to the current point from one or more coordinate vectors related to media objects having associated user preferences.

* * * * *

UNITED STATES PATENT AND TRADEMARK OFFICE
CERTIFICATE OF CORRECTION

| | | |
|---|---|---|
| PATENT NO. | : 7,340,455 B2 | Page 1 of 1 |
| APPLICATION NO. | : 11/045930 | |
| DATED | : March 4, 2008 | |
| INVENTOR(S) | : John Platt et al. | |

It is certified that error appears in the above-identified patent and that said Letters Patent is hereby corrected as shown below:

In column 24, line 49, in Claim 1, delete "point;" and insert --point--, therefor.

In column 26, line 26, in Claim 15, delete "by;" and insert --by:--, therefor.

Signed and Sealed this
Twenty-second Day of February, 2011

David J. Kappos
*Director of the United States Patent and Trademark Office*